United States Patent
Inoue et al.

(10) Patent No.: US 9,344,020 B2
(45) Date of Patent: May 17, 2016

(54) POWER CONVERSION APPARATUS AND ELECTRICAL-MECHANICAL ENERGY CONVERSION SYSTEM

(71) Applicant: Hitachi, Ltd., Tokyo (JP)

(72) Inventors: Shigenori Inoue, Tokyo (JP); Shuji Katoh, Tokyo (JP); Hironari Kawazoe, Tokyo (JP); Osamu Tomobe, Tokyo (JP); Toru Yoshihara, Tokyo (JP); Kenta Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 14/321,507

(22) Filed: Jul. 1, 2014

(65) Prior Publication Data
US 2015/0008859 A1 Jan. 8, 2015

(30) Foreign Application Priority Data
Jul. 2, 2013 (JP) .................. 2013-138804

(51) Int. Cl.
| | |
|---|---|
| H02P 27/04 | (2006.01) |
| H02P 6/14 | (2016.01) |
| H02M 7/483 | (2007.01) |
| H02P 25/16 | (2006.01) |

(52) U.S. Cl.
CPC ............... *H02P 6/14* (2013.01); *H02M 7/483* (2013.01); *H02M 2007/4835* (2013.01); *H02P 25/16* (2013.01); *H02P 27/04* (2013.01)

(58) Field of Classification Search
USPC .......... 318/800, 801, 139; 363/34, 35, 36, 37, 363/40, 67, 71, 87, 95, 98, 120, 124, 175, 363/176
See application file for complete search history.

(56) References Cited

U.S. PATENT DOCUMENTS

| | | | |
|---|---|---|---|
| 7,495,938 B2 * | 2/2009 | Wu | ............... H02M 7/487 363/172 |
| 8,619,446 B2 * | 12/2013 | Liu et al. | .................. 363/71 |
| 2006/0227483 A1 * | 10/2006 | Akagi | ................ 361/118 |
| 2012/0026767 A1 * | 2/2012 | Inoue et al. | ............ 363/89 |
| 2013/0314046 A1 | 11/2013 | Feuerstack et al. | |

FOREIGN PATENT DOCUMENTS

| | | |
|---|---|---|
| DE | 102011003861 A1 | 8/2012 |
| EP | 2416486 A1 | 2/2012 |
| JP | 5268739 B2 | 5/2013 |

OTHER PUBLICATIONS

Hagiwara et al., "A Medium-Voltage Motor Drive with a Modular Multilevel PWM Inverter Part I. Experimental Verification by a 400-V, 15-kW Downscaled Model", IEEJ Transaction Industry Applications, Apr. 2010, vol. 130, No. 4, pp. 544-551.
European Office Action, European Patent Application No. 14175047.1, Jul. 21, 2015, 7 pages.

* cited by examiner

*Primary Examiner* — Antony M Paul
(74) *Attorney, Agent, or Firm* — Volpe and Koenig, P.C.

(57) ABSTRACT

A power conversion apparatus includes arms in each of which one or more unit converters each including a capacitor and capable of outputting an arbitrary voltage are connected in series, and a point P as a first node to which one end of the respective arms are Y-connected, and a point N as a second node to which a neutral terminal of the rotary electric machine is connected. The other end of the respective arms are connected to one ends of respective phase windings of a rotary electric machine.

11 Claims, 7 Drawing Sheets

POWER CONVERSION APPARATUS AND ELECTRICAL-MECHANICAL ENERGY CONVERSION SYSTEM

BACKGROUND OF THE INVENTION

1. Field of the Invention

The present invention relates to a power conversion apparatus for converting DC power into AC power or AC power to DC power, and an electrical-mechanical energy conversion system using this power conversion apparatus.

2. Description of Related Art

The preface of Non Patent Literature 1 (Makoto Hagiwara, Kazutoshi Nishimura, Hirofumi Akagi, "A Medium-Voltage Motor Drive with a Modular Multilevel PWM Inverter Part I. Experimental Verification by a400-V, 15-kW Downscaled Model", IEEJ Transactionson Industry Applications, April 2010, Vol. 130, No. 4, pp. 544-551) states that "In this paper, the feasibility of a medium-voltage motor drive using a three-phase MMI is considered. A downscaled model of 400V, 15 kW is designed and built, and the control method and operation characteristics will be verified." FIG. 1(a) of Non Patent Literature 1 shows a main circuit structure of the three-phase MMI. The MMI is an abbreviation of Modular Multi-level PWM (Pulse Width Modulation) Inverter. The three-phase MMI is a power conversion apparatus in which series circuits each including an arm of a series circuit of one or more unit converters and a reactor are connected in three phase bridge configuration. FIGS. 3 to 5 of Non Patent Literature 1 show experimental results obtained by driving an AC motor connected to the AC output terminal of the three-phase MMI.

The three-phase MMI is a kind of multi-level converter and uses a switching element capable of controlling ON/OFF, such as an IGBT (Insulated-Gate Bipolar Transistor), a GTO (Gate Turn-Off Thyristor) or a GCT (Gate-Commutated Thyristor) and can output a voltage higher than the withstand voltage of the switching element.

The power conversion apparatus shown in FIG. 1 (*a*) of Non Patent Literature 1 requires one reactor for each phase in order to suppress a current circulating through each arm. Thus, the volume and weight of the whole power conversion apparatus may be large, and the installation footprint also may be large.

Further, since the reactor is provided between the arm of each phase and the rotary electric machine, the arm voltage can not be directly applied to the rotary electric machine, and there is the likelihood that the controllability of the rotary electric machine is reduced.

SUMMARY OF THE INVENTION

The invention provides a power conversion apparatus in which a rotary electric machine and an arm can be connected to each other without a reactor, and an electrical-mechanical energy conversion system using this power conversion apparatus.

According to a first aspect of the invention, a power conversion apparatus includes three or more arms in each of which one or more unit converters each including an energy storage element and capable of outputting an arbitrary voltage are connected in series, and a first node to which one ends of the respective arms are Y-connected, and other ends of the respective arms are connected to one ends of respective phase windings of a rotary electric machine.

By this, since the arms and the respective phase windings of the rotary electric machine are connected to each other without a reactor, the controllability of the rotary electric machine can be improved. Besides, since a reactor for each phase is not required, the volume and weight of the whole power conversion apparatus is made compact and the power conversion apparatus can be installed in a small area.

According to a second aspect of the invention, an electrical-mechanical energy conversion system includes a power conversion apparatus which includes three or more arms in each of which one or more unit converters each including an energy storage element and capable of outputting an arbitrary voltage are connected in series, and a first node to which one end of the respective arms are Y-connected, and a rotary electric machine to which a mechanical load is connected and in which other end of the respective arms are connected to one end of respective phase windings.

By this, the controllability of the rotary electric machine is improved, the volume and weight of the whole power conversion apparatus is made compact, and the power conversion apparatus can be installed in a small area. Accordingly, the compact and well-controllable electrical-mechanical energy conversion system can be provided.

Other aspects of the invention will be described in the column of Description of Embodiments.

According to the aspects of the invention, the power conversion apparatus in which the rotary electric machine and the arm can be connected to each other without a reactor, and the electrical-mechanical energy conversion system using the power conversion apparatus can be provided.

DESCRIPTION OF EMBODIMENTS

Hereinafter, embodiments of the invention will be described with reference to the drawings.

First Embodiment

Figure 1:
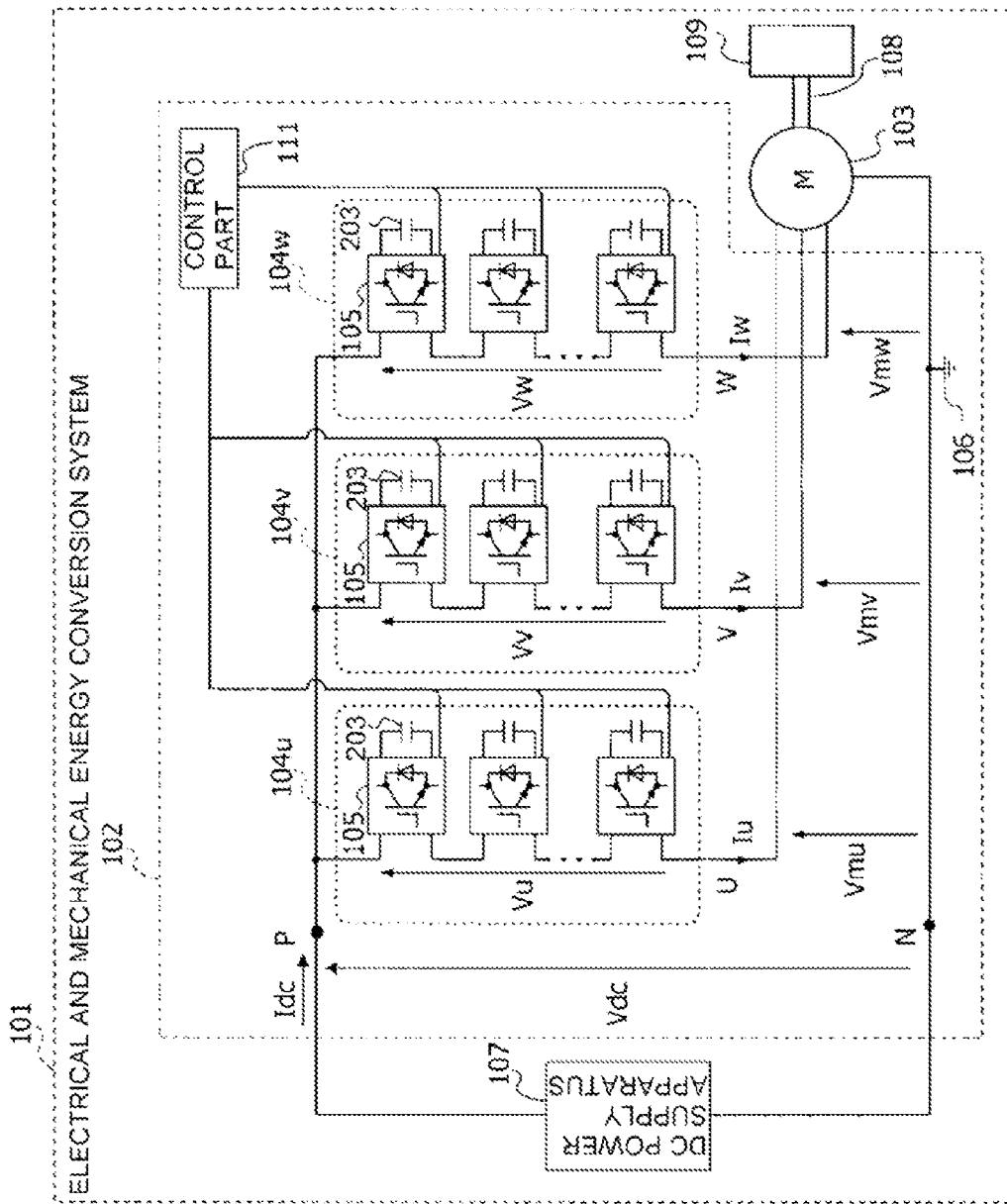
FIG. 1 is a schematic structural view showing a power conversion apparatus of a first embodiment.

FIG. 1 is a schematic structural view showing a power conversion apparatus 102 of a first embodiment.

As shown in FIG. 1, an electrical-mechanical energy conversion system 101 includes a DC power supply apparatus 107, the power conversion apparatus 102, a rotary electric machine 103 and a mechanical load 109.

The DC power supply apparatus 107 supplies DC power through the point P and the point N. The DC power supply apparatus 107 is, for example, a diode rectifier, a thyristor rectifier, a PWM rectifier, a modular multi-level rectifier, a battery, a secondary battery or a DC power system, and is arbitrary as long as the DC power can be supplied.

The power conversion apparatus 102 converts the DC power supplied from the DC power supply apparatus 107 through the point P and the point N into AC power, and drives the rotary electric machine 103 connected to the point U, the point V and the point W. The rotary electric machine 103 is, for example, a three-phase motor. The point U is one end of the U-phase winding of the rotary electric machine 103. The point V is one end of the V-phase winding of the rotary electric machine 103. The point W is one end of the W-phase winding of the rotary electric machine 103. The respective phase windings of the rotary electric machine 103 are Y-connected and are connected to the point N as a second node.

The rotary electric machine 103 is mechanically connected to a shaft 108 and the mechanical load 109. The mechanical load 109 is connected to the shaft 108 and is rotated and driven. By this, the electrical-mechanical energy conversion system 101 can convert the electrical energy supplied as the DC power into mechanical energy.

The point U, the point V and the point W are one ends of stator windings of the rotary electric machine 103. Incidentally, the point U, the point V and the point W may be one ends of rotor windings of the rotary electric machine 103, and a neutral terminal to which the other ends of the rotor windings are Y-connected may be connected to the point N as the second node. In the following description, the description will be made without particularly distinguishing whether the point U, the point V and the point W are one ends of the stator windings or one ends of the rotor windings.

Next, an inner structure of the power conversion apparatus 102 will be described.

The power conversion apparatus 102 includes three arms 104u, 104v and 104w, and a control part 111. Each of the arms 104u, 104v and 104w is constructed such that one or more unit converters 105 each including a capacitor 203 as an energy storage element and capable of outputting an arbitrary voltage are connected in series. Hereinafter, when the arms 104u, 104v and 104w are not particularly distinguished, they are respectively simply referred to as an arm 104. In the first embodiment, since the number of phases of the rotary electric machine 103 is three, the number of the arms 104 is three. However, no limitation is made to this. If the number of phases of the rotary electric machine 103 is four or more, the same number of arms 104 as the number of phases may be provided, and three or more arms may be provided.

One ends of the arms 104u, 104v and 104w are Y-connected to the point P as a first node. The other end of the arm 104u is connected to one end of the U-phase winding of the rotary electric machine 103 through the point U. The other end of the arm 104v is connected to one end of the V-phase winding of the rotary electric machine 103 through the point V. The other end of the arm 104w is connected to one end of the W-phase winding of the rotary electric machine 103 through the point W.

The neutral terminal of the rotary electric machine 103 is a node to which the other end of the U-phase winding, the other end of the V-phase winding and the other end of the W-phase winding are connected, and is connected to the point N as the second node. By this, the power conversion apparatus 102 supplies AC current to the respective phase windings of the rotary electric machine 103 and can rotate and drive.

The point N as the second node is further connected to a ground point 106. Thus, the neutral terminal of the rotary electric machine 103 is grounded through the second node. Accordingly, the DC component of ground potential of the rotary electric machine 103 can be made substantially zero and there is no fear of electric leakage.

The DC power supply apparatus 107 is connected to the point P and the point N.

The control part 111 controls one or plural unit converters 105 constituting each of the arms 104u, 104v and 104w. The control part 111 is connected to the respective unit converters 105 constituting each of the arms 104u, 104v and 104w, and controls the output voltage, and accordingly controls the rotation driving of the rotary electric machine 103.

Here, for convenience of description, voltages and currents shown in FIG. 1 are defined as follows.

A voltage between the point P and the point N is a DC voltage Vdc. A current flowing from the DC power supply apparatus 107 to the point P is a DC current Idc.

The arm 104u outputs an arm voltage Vu. The arm 104v outputs an arm voltage Vv. The arm 104w outputs an arm voltage Vw. Incidentally, each of the arm voltages Vu, Vv and Vw is the sum of output voltages of the respective unit converters 105 included in each of the arms 104u, 104v and 104w. An arm current Iu flows from the arm 104u to the point U. An arm current Iv flows from the arm 10v to the point V. An arm current Iw flows from the arm 104w to the point W.

An applied voltage Vmu is a voltage applied between the point U of the rotary electric machine 103 and the point N.

An applied voltage Vmv is a voltage applied between the point V of the rotary electric machine 103 and the point N. An applied voltage Vmw is a voltage applied between the point W of the rotary electric machine 103 and the point N.

Hereinafter, an example of an inner structure of the unit converter 105 and a control method of output voltage will be described by use of FIG. 2 and FIG. 3.

In the power conversion apparatus 102, for example, a unit converter 105C (see FIG. 2) of a bi-directional chopper circuit system capable of outputting a monopolar voltage can be used as the unit converter 105. By this, in the power conversion apparatus 102, the number of switching elements intervening between the input/output terminal of the unit converter 105C and the capacitor 203 as the energy storage element can be made one as the minimum number. Accordingly, energy loss due to power conversion can be reduced.

Further, in the power conversion apparatus 102, a unit converter 105F (see FIG. 3) of a full-bridge circuit system capable of outputting a bipolar voltage can be used as the unit converter 105. By this, the power conversion apparatus 102 can output a positive voltage and a negative voltage of the capacitor 203 as the energy storage element and a zero voltage from the input/output terminal of the unit converter 105F. Thus, even when AC power is supplied to the power conversion apparatus 102, the rotary electric machine 103 can be rotated and driven.

Each of the arms 104 of the first embodiment is constructed of only the unit converter 105C (see FIG. 2) of the bi-directional chopper circuit system. However, no limitation is made to this, and each of the arms 104 may be constructed of only the unit converter 105F (see FIG. 3) of the full-bridge circuit system. Further, each of the arms 104 may be constructed such that the unit converter 105C (see FIG. 2) of the bi-directional chopper circuit system and the unit converter 105F (see FIG. 2) of the full-bridge circuit system are mixed. By this, the effect of reduction in energy loss due to power conversion and the effect of increase in the degree of freedom of input and output voltages by the bipolar voltage output can be obtained.

Figure 2:
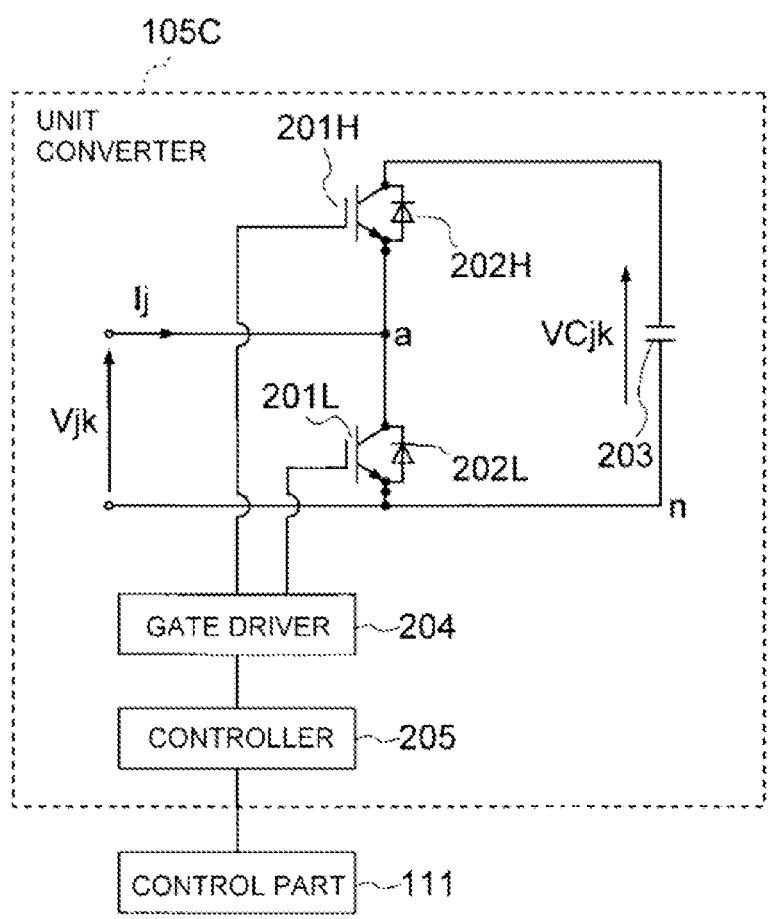
FIG. 2 is a view showing a unit converter of a bi-directional chopper circuit system.

FIG. 2 is a view showing the unit converter 105C of the bi-directional chopper circuit system.

As shown in FIG. 2, the unit converter 105C includes a circuit in which an upper switching element 201H and a free-wheeling diode 202H are reversely parallel-connected, a circuit in which a lower switching element 201L and a free-wheeling diode 202L are reversely parallel-connected, and a capacitor 203.

A cathode of the free-wheeling diode 202H is connected to a collector of the upper switching element 201H and is connected to one end of the capacitor 203. An emitter of the switching element 201H is connected to an anode of the free-wheeling diode 202H and is connected to one input/output terminal of the unit converter 105 through a point "a". A gate driver 204 is connected to a gate of the switching element 201H.

Similarly, a collector of the lower switching element 201L is connected to a cathode of the free-wheeling diode 202L and is connected to the point "a". An emitter of the switching element 201L is connected to an anode of the free-wheeling diode 202L and is connected to the other input/output terminal of the unit converter 105C, and is further connected to the other end of the capacitor 203 through a point "n". The gate driver 204 is connected to a gate of the switching element 201L. The gate driver 204 is electrically connected to a controller 205. The controller 205 is connected to the control part 111 through an optical fiber.

The capacitor 203 is, for example, an electrolytic capacitor, and is the energy storage element of the unit converter 105C of the bi-directional chopper circuit system.

Figure 3:
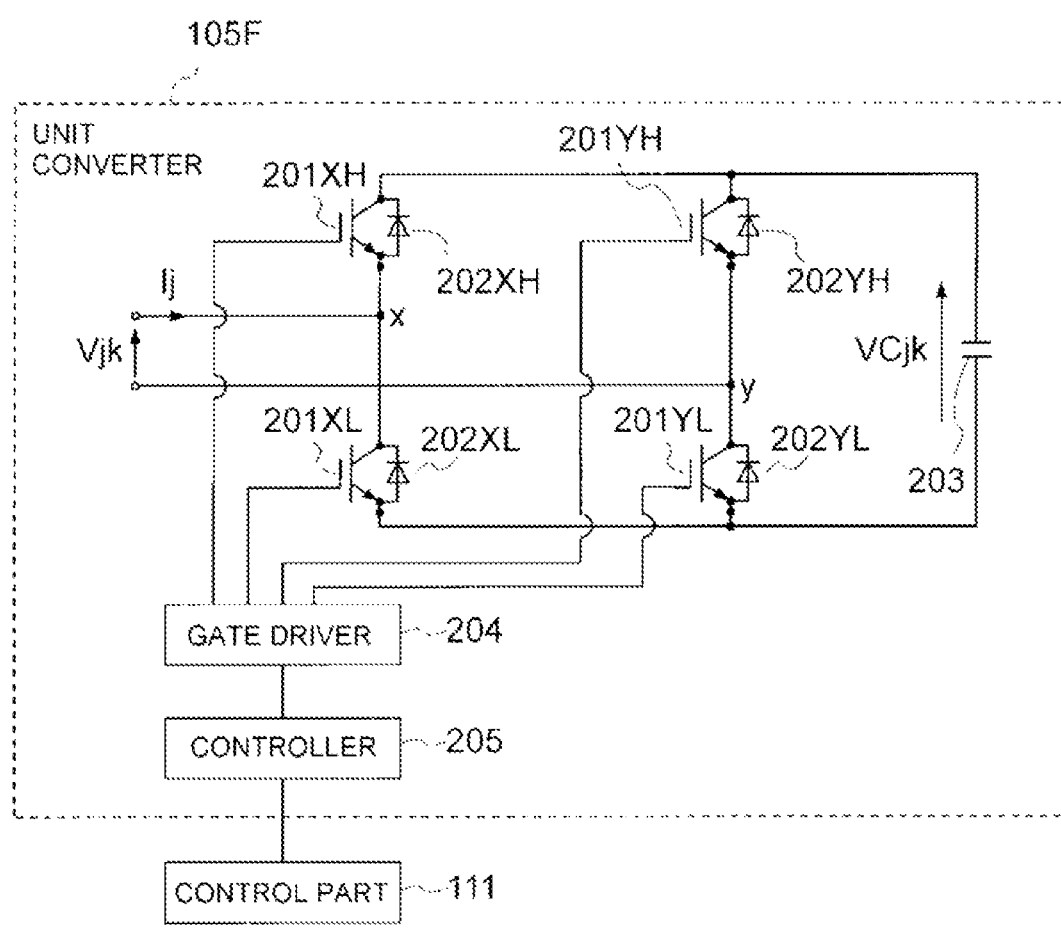
FIG. 3 is a view showing a unit converter of a full-bridge circuit system.

In the specification, the upper switching element 201H and the lower switching element 201L, and an after-mentioned X-phase upper switching element 201XH, an X-phase lower switching element 201XL, a Y-phase upper switching element 201YH, and a Y-phase lower switching element 201YL shown in FIG. 3 are sometimes collectively called as a switching element 201.

As shown in FIG. 2, in the first embodiment, an IGBT is used as the switching element 201. However, no limitation is made to this. In the invention, another kind of a switching element which is a power semiconductor device capable of controlling ON and OFF, such as a GTO, a GCT or a MOSFET (Metal-Oxide-Semiconductor Field Effect Transistor), may be used as the switching element 201.

An output voltage Vjk is a voltage applied between the point "a" of FIG. 2 and the point "n" as the other end of the capacitor 203, and is the output voltage of the unit converter 105C of the bi-directional chopper circuit system. Here, j denotes one of a u phase, a v phase and a w phase. Besides, k denotes a natural number between 1 and M, and M denotes the number of the unit converters 105C included in each of the arms 104u, 104v and 104w.

A current Ij flows from the one input/output terminal of the unit converter 105C to the point "a". Here, j is a symbol indicating one of the u phase, the v phase and the w phase.

Hereinafter, a relation between the output voltage Vjk and the on/off states of the switching elements 201H and 201L will be described.

When the upper switching element 201H is on and the lower switching element 201L is off, control can be made so that the output voltage Vjk becomes substantially equal to a capacitor voltage VCjk irrespective of the current Ij.

When the upper switching element 201H is off and the lower switching element 201L is on, control can be made so that the output voltage Vjk becomes substantially equal to zero irrespective of the current Ij.

FIG. 3 is a view showing the unit converter 105F of the full-bridge circuit system.

As shown in FIG. 3, the unit converter 105F includes an X-phase circuit in which a circuit including the upper switching element 201XH and a free-wheeling diode 202XH inversely parallel connected to each other is connected in series to a circuit including the lower switching element 201XL and a free-wheeling diode 202XL inversely parallel connected to each other.

Besides, the unit converter 105F includes a Y-phase circuit in which a circuit, including the upper switching element 201YH and a free-wheeling diode 202YH which are inversely parallel connected to each other, is connected in series to a circuit including the lower switching element 201YL and a free-wheeling diode 202YL inversely parallel connected to each other, and further, a capacitor 203 is parallel connected to the X-phase circuit and the Y-phase circuit.

In the X-phase circuit, a collector of the upper switching element 201XH is connected to a cathode of the free-wheeling diode 202XH and is connected to one end of the capacitor 203. An emitter of the switching element 201XH is connected to an anode of the free-wheeling diode 202XH and is connected to one input/output terminal of the unit converter 105F through a point "x". A gate of the switching element 201XH is connected to a gate driver 204.

Similarly, a collector of the lower switching element 201XL is connected to a cathode of the free-wheeling diode 202XL and is connected to the point "x". An emitter of the switching element 201XL is connected to an anode of the free-wheeling diode 202XL and is connected to the other end of the capacitor 203. A gate of the switching element 201XL is connected to the gate driver 204.

In the Y-phase circuit, a collector of the upper switching element 201YH is connected to a cathode of the free-wheeling diode 202YH and is connected to the one end of the capacitor 203. An emitter of the switching element 201YH is connected to an anode of the free-wheeling diode 202YH and is connected to the other input/output terminal of the unit converter 105F through a point "y". A gate of the switching element 201YH is connected to the gate driver 204.

Similarly, a collector of the lower switching element 201YL is connected to a cathode of the free-wheeling diode 202YL and is connected to the point "y". An emitter of the switching element 201YL is connected to an anode of the free-wheeling diode 202YL and is connected to the other end of the capacitor 203. A gate of the switching element 201YL is connected to the gate driver 204.

The gate driver 204 is electrically connected to a controller 205. The controller 205 is connected to a control part 111 through an optical fiber.

The capacitor 203 is the energy storage element of the unit converter 105F. Incidentally, no limitation is made to this. In the unit converter 105F, instead of the capacitor 203, a secondary battery or the like may be used as the energy storage element.

An output voltage Vjk is a voltage applied between the point "x" and the point "y", and is the output voltage of the unit converter 105F of the full-bridge circuit system. A current Ij flows from one input/output terminal of the unit converter 105F to the point x.

Hereinafter, a relation between the output voltage Vjk and the on/off states of the switching elements 201XH, 201XL, 201YH and 201YL.

When the X-phase upper switching element 201XH is on, the lower switching element 201XL is off, the Y-phase upper switching element 201YH is on, and the lower switching element 201YL is off, control can be made so that the output voltage Vjk becomes substantially equal to zero irrespective of the current Ij.

When the X-phase upper switching element 201XH is on, the lower switching element 201XL is off, the Y-phase upper switching element 201YH is off, and the lower switching element 201YL is on, control can be made so that the output voltage Vjk becomes substantially equal to a capacitor voltage VCjk irrespective of the current Ij.

When the X-phase upper switching element 201XH is off, the lower switching element 201XL is on, the Y-phase upper switching element 201YH is on, and the lower switching element 201YL is off, control can be made so that the output voltage Vjk becomes substantially equal to a voltage (−VCjk) of a polarity reverse to the polarity of the capacitor voltage VCjk irrespective of the current Ij.

When the X-phase upper switching element 201XH is off, the lower switching element 201XL is on, the Y-phase upper switching element 201YH is off, and the lower switching element 201YL is on, control can be made so that the output voltage Vjk becomes substantially equal to zero irrespective of the current Ij.

Hereinafter, a method of controlling the applied voltages Vmu, Vmv and Vmw to the rotary electric machine 103 and a method of controlling the operation of the rotary electric machine 103 through the applied voltages Vmu, Vmv and Vmx will be described.

First, each of the arm voltages Vu, Vv and Vw outputted by the respective arms 104$u$, 104$v$ and 104$w$ is the sum of the output voltage Vjk of the one or plural unit converters 105 included in the arm 104. Thus, if the output voltage of each of the unit converters 105 is controlled, the arm voltages Vu, Vv and Vw can be controlled.

The applied voltages Vmu, Vmv and Vmw to the rotary electric machine 103, the DC voltage Vdc, and the arm voltages Vu, Vv and Vw satisfy expressions (1) to (3).

The U-phase applied voltage Vmu to the rotary electric machine 103 is obtained by subtracting the arm voltage Vu from the DC voltage Vdc as indicated by expression (1).

$$Vmu = Vdc - Vu \quad (1)$$

The V-phase applied voltage Vmv to the rotary electric machine 103 is obtained by subtracting the arm voltage Vv from the DC voltage Vdc as indicated by expression (2).

$$Vmv = Vdc - Vv \quad (2)$$

The W-phase applied voltage Vmw of the rotary electric machine 103 is obtained by subtracting the arm voltage Vw from the DC voltage Vdc as indicated by expression (3).

$$Vmw = Vdc - Vw \quad (3)$$

In other words, the respective arms 104$u$, 104$v$ and 104$w$ can apply arbitrary voltages to the respective phases of the rotary electric machine 103 based on the expressions (1) to (3) by controlling the arm voltages Vu, Vv and Vw. If the control part 111 controls so that the DC voltage Vdc becomes substantially equal to the DC components included in the arm voltages Vu, Vv and Vw, control can be made so that the applied voltages Vmu, Vmv and Vmw to the rotary electric machine 103 include only AC components. From the above, the control part 111 can control so that the applied voltages Vmu, Vmv and Vmw to the rotary electric machine 103 become three-phase AC voltages of adjustable amplitude and adjustable frequency.

The control part 111 can control the applied voltages Vmu, Vmv and Vmw to the rotary electric machine 103 to the adjustable-amplitude and adjustable-frequency three-phase AC voltage. Thus, the torque, rotation speed, position and the like of the rotary electric machine 103 can be controlled by performing, for example, V/f control or vector control.

Incidentally, according to the invention, if the amplitudes of the applied voltages Vmu, Vmv and Vmw to the rotary electric machine are made the same, as compared with the comparative example disclosed in Non Patent Literature 1, there is also an effect that the DC voltage Vdc can be reduced to ½. The reason will be described below.

In the comparative example disclosed in Non Patent Literature 1, eight unit converters are used for each phase, the eight unit converters are divided into four positive side converters and four negative side converters, and the four unit converters respectively share ¼ of AC voltage. With respect to DC voltage, the eight unit converters respectively share ⅛. In other words, if the number of unit converters provided for each phase is M, (M/2) unit converts share AC voltage, and M unit converters share DC voltage.

In this embodiment, M unit converters 105 share both AC voltage and DC voltage. Thus, if AC voltage of the same amplitude is outputted, DC voltage can be reduced to ½ as compared with the comparative example.

As shown in FIG. 1, the arm currents Iu, Iv and Iw include positive-sequence and zero-sequence components. The positive-sequence components of the arm currents Iu, Iv and Iw form rotating magnetic field in the rotary electric machine 103, and contribute to the control of the torque, rotation speed, position and the like of the rotary electric machine 103. The zero-sequence components of the arm currents Iu, Iv and Iw correspond to ⅓ of the sum of the respective arm currents Iu, Iv and Iw. The sum of the respective arm currents Iu, Iv and Iw is equal to the DC current Idc. By this, the zero-sequence components of the arm currents Iu, Iv and Iw correspond to ⅓ of the DC current Idc. Accordingly, Idc/3 flows as the zero-sequence currents through the rotary electric machine 103. The magnetic field of the rotary electric machine 103 generated by the zero-sequence currents becomes zero. Thus, the zero-sequence currents do not influence the control of the torque, rotation speed, position and the like of the rotary electric machine 103.

Hereinafter, with reference to FIGS. 4A to 4C, a description will be made on a fact that when ⅓ (=Idc/3) of the DC current Idc flows as the zero-sequence current through the rotary electric machine 103, the magnetic field of the rotary electric machine 103 becomes substantially zero.

Figure 4A:
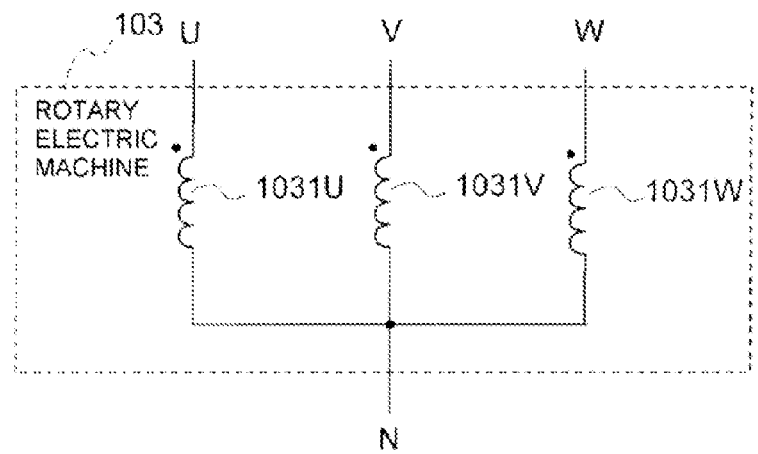
FIGS. 4A to 4C are views showing a structure and an operation of a rotary electric machine in the first embodiment.
Figure 4B:
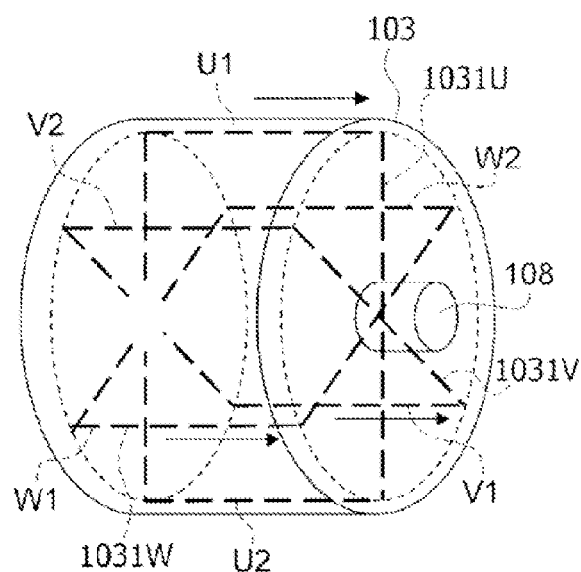
Figure 4C:
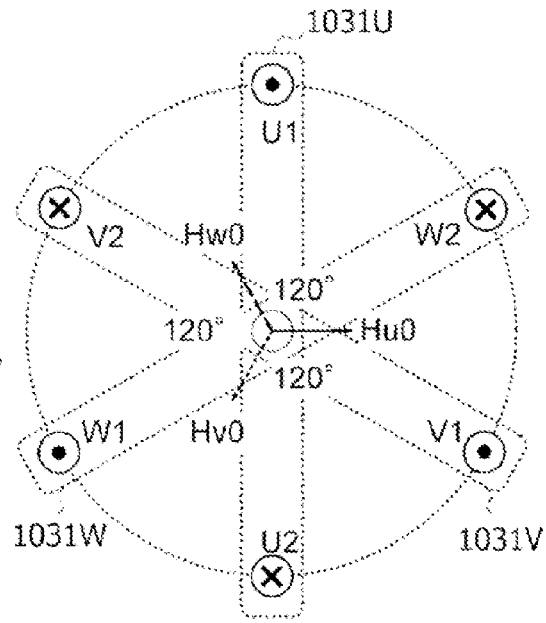

FIGS. 4A to 4C are views showing the structure and operation of the rotary electric machine 103. FIG. 4A is a circuit view of the inside of the rotary electric machine 103. FIG. 4B is a perspective view of the rotary electric machine 103. FIG. 4C is a view showing magnetic fields of the rotary electric machine 103 by zero-sequence currents.

As shown in FIG. 4A, the rotary electric machine 103 includes a U-phase winding 1031U, a V-phase winding 1031V and a W-phase winding 1031W, and these are Y-connected and are connected to a neutral terminal N.

As shown in FIG. 4B, in the rotary electric machine 103, the U-phase winding 1031U, the V-phase winding 1031V and the W-phase winding 1031W are wound at positions mechanically different from each other by 120 degrees. By this, the positive-sequences components of the arm currents Iu, Iv and Iw can form rotating magnetic fields.

FIG. 4C is a sectional view perpendicular to the rotation shaft of the rotary electric machine 103 shown in FIG. 4B, and shows the respective windings 1031U, 1031V and 1031W. In FIG. 4C, positive-sequence components included in the arm currents Iu, Iv and Iw are neglected, and only magnetic fields Hu0, Hv0 and Hw0 generated by the zero-sequence components (Idc/3) are shown.

The zero-sequence component (Idc/3) of the arm current Iu flowing through the U-phase arm 104$u$ and the U-phase winding 1031U of the rotary electric machine 103 flows in a direction from back to front of the drawing at a point U1, and flows in a direction from front to back of the drawing at a point U2. The zero-sequence (Idc/3) of the arm current Iu flowing through the U-phase winding 1031U forms a magnetic field Hu0.

The zero-sequence component (Idc/3) of the arm current Iv flowing through the V-phase arm 104v and the V-phase winding 1031V of the rotary electric machine 103 flows in the direction from back to front of the drawing at a point V1, and flows in the direction from front to back of the drawing at a point V2. The zero-sequence (Idc/3) of the arm current Iv flowing through V-phase winding 1031V forms a magnetic field Hv0.

The zero-sequence component (Idc/3) of the arm current Iw flowing through the W-phase arm 104w and the W-phase winding 1031W of the rotary electric machine 103 flows in the direction from back to front of the drawing at a point W1, and flows in the direction from front to back of the drawing at a point W2. The zero-sequence (Idc/3) of the arm current Iw flowing through the W-phase winding 1031W forms a magnetic field Hw0.

As shown in FIG. 4C, the magnetic fields Hu0, Hv0 and Hw0 formed by the zero-sequence currents Idc/3 flowing through the three windings 1031U, 1031V and 1031W have vectors having the same magnitude and directions different from each other by 120 degrees. Thus, the vector sum of the magnetic fields Hu0, Hv0 and Hw0 becomes zero. In other words, the zero-sequence currents Idc/3 flowing through the respective windings 1031U, 1031V and 1031W do not form magnetic field in the rotary electric machine 103. Accordingly, the zero-sequence currents Idc/3 do not influence the control of the torque, rotation speed, position and the like.

In the above, it has been described that the torque, rotation speed, position and the like of the rotary electric machine 103 can be controlled through the arm voltages Vu, Vv and Vw, and even if ⅓ of the DC current Idc flows through the rotary electric machine 103, the control of the torque, rotation speed, position and the like is not influenced.

According to the first embodiment, there is an effect that the power conversion apparatus 102 for driving the rotary electric machine 103 can be constructed without using one reactor for each phase, which is inevitable in the comparative example (Non Patent Literature 1).

Further, when the mechanical load 109 is mechanically connected to the shaft 108 of the rotary electric machine 103 of the power conversion apparatus 102, there is an effect that an electrical-mechanical energy conversion system including the mechanical load 109 of the rotary electric machine 103 can be constructed.

In the comparative example (Non Patent Literature 1), when one end of a DC terminal is grounded, the DC component of ground potential of the rotary electric machine becomes ½ of the DC voltage outputted by the DC power supply apparatus. On the other hand, in the power conversion apparatus 102 of the first embodiment, the DC component of ground potential of the rotary electric machine 103 can be made substantially zero. Thus, there are effects that the thickness of an insulation material for securing dielectric strength of the rotary electric machine 103 can be reduced, and a space between the rotary electric machine 103 and the outside can be narrowed.

Second Embodiment

Figure 5:
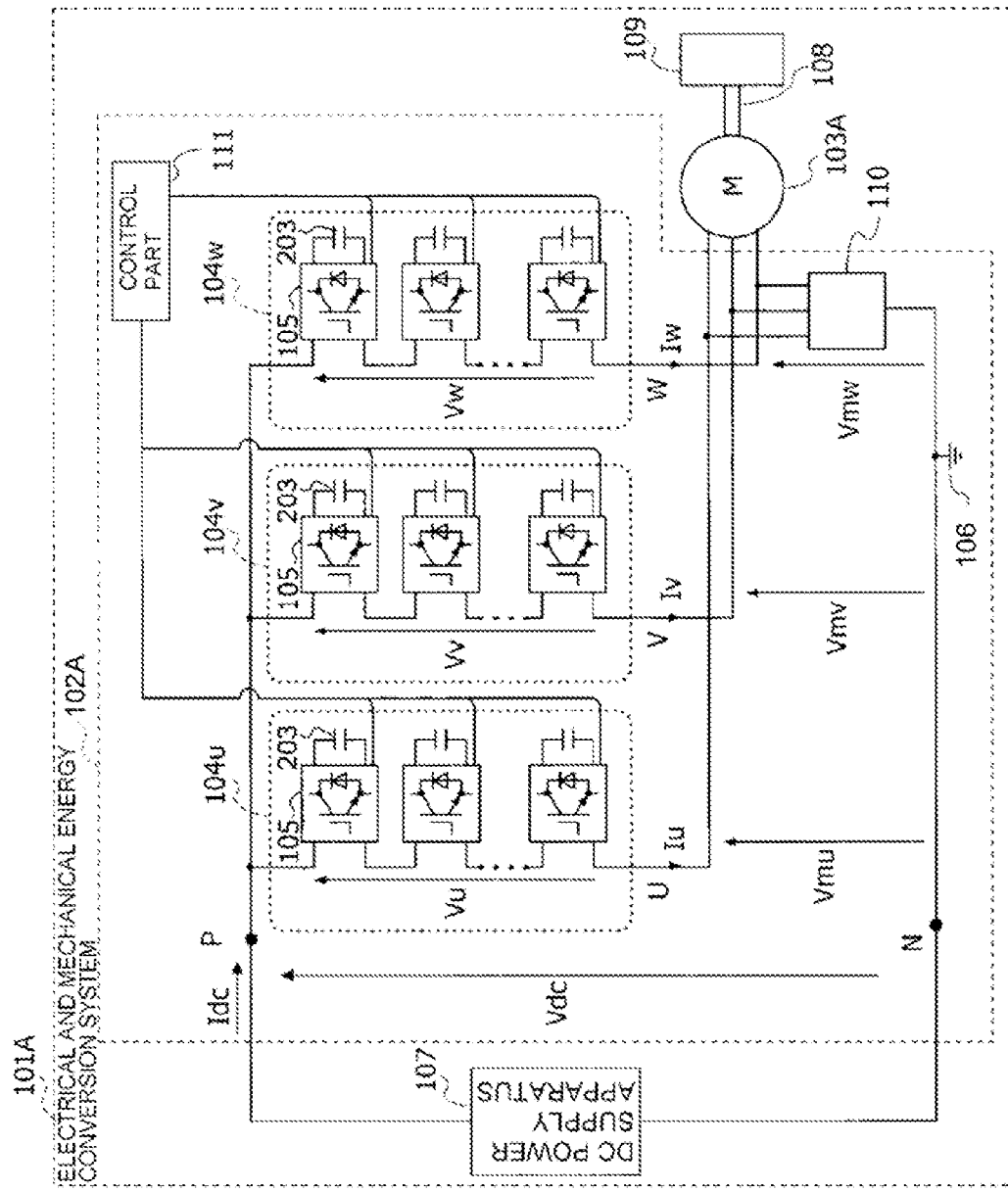
FIG. 5 is a schematic structural view showing a power conversion apparatus of a second embodiment.

FIG. 5 is a schematic structural view showing a power conversion apparatus 102A of a second embodiment. The same components as those of the power conversion apparatus 102 of the first embodiment shown in FIG. 1 are denoted by the same reference numerals.

An electrical-mechanical energy conversion system 101A of the second embodiment shown in FIG. 5 includes the power conversion apparatus 102A different from the first embodiment and a rotary electric machine 103A. The power conversion apparatus 102A of the second embodiment includes a reactor 110 with a neutral terminal in addition to the same structure as that of the first embodiment.

In the power conversion apparatus 102A of the second embodiment, one ends of respective arms 104 in each of which one or more unit converters 105 are connected in series are Y-connected to a point P as a first node, and the other ends of the respective arms 104 are connected in parallel to one ends of respective phase windings of the rotary electric machine 103A and one ends of respective phase windings of the reactor 110 with the neutral terminal. The neutral terminal of the reactor 110 with the neutral terminal is connected to a point N as a second node. A DC power supply apparatus 107 supplies DC power to the power conversion apparatus 102A through the point P and the point N.

In the rotary electric machine 103A, the neutral terminal is not drawn differently from the rotary electric machine 103 (see FIG. 1) of the first embodiment. According to the second embodiment, the same effect as the first embodiment can be obtained, and further, there is an effect that the power conversion apparatus 102A for driving the rotary electric machine 103A can be constructed without using the neutral terminal of the rotary electric machine 103A differently from the first embodiment. By this, the invention can be applied not only to the Y-connected rotary electric machine 103A but also to the Δ-connected rotary electric machine.

The neutral terminal of the reactor 110 with the neutral terminal is connected to a ground point 106 through the point N. By doing so, similarly to the first embodiment, the DC component of the ground potential of the rotary electric machine 103A can be made substantially zero, and the ground potential of the reactor 110 with the neutral terminal can be reduced. Thus, there is no fear of electric leakage.

A DC current Idc branches into three currents, flows through respective arms 104u, 104v and 104w, and flows to the point N as the second node through the reactor 110 with the neutral terminal. Incidentally, a reactor as in the comparative example is not connected to a current path from each of the arms 104u, 104v and 104w to the rotary electric machine 103A.

In the comparative example disclosed in Non Patent Literature 1, in order to suppress circulation current flowing between arms, a reactor is connected between an upper arm and a lower arm of each phase. On the other hand, in the power conversion apparatus 102A of the second embodiment, since the reactor 110 with the neutral terminal suppresses the circulation current, it is unnecessary to connect a reactor between the rotary electric machine 103A and each of the arms 104u, 104v and 104w. Thus, arm voltages Vu, Vv and Vw outputted by the arms 104u, 104v and 104w can be directly applied to the rotary electric machine 103A without a reactor. By this, there is obtained an effect that the controllability of the rotary electric machine 103A can be improved.

Three-phase AC power does not pass through the reactor 110 with the neutral terminal, but only DC power passes. Thus, it is preferable that in the reactor 110 with the neutral terminal, positive-sequence inductance is designed to be large, and zero-sequence inductance is made small. The positive-sequence inductance of the reactor 110 with the neutral terminal is made large, so that most of positive-sequence of the arm currents Iu, Iv and Iw flowing through the respective arms 104u, 104v and 104w flow to the rotary electric machine 103A. Thus, rotation driving can be efficiently performed.

However, the zero-sequence inductance of the reactor 110 with the neutral terminal must be made larger than a minimum value required for control of the DC current Idc.

Besides, when the zero-sequence inductance of the reactor 110 with the neutral terminal is decreased, magnetic flux generated in the reactor 110 with the neutral terminal by the DC current Idc can be decreased. Thus, there is an effect that the reactor 110 with the neutral terminal and the power conversion apparatus 102A using the same can be miniaturized.

Next, an example of an inner structure of the reactor 110 with the neutral terminal will be described with reference to FIG. 6 and FIGS. 7A and 7B.

Figure 6:
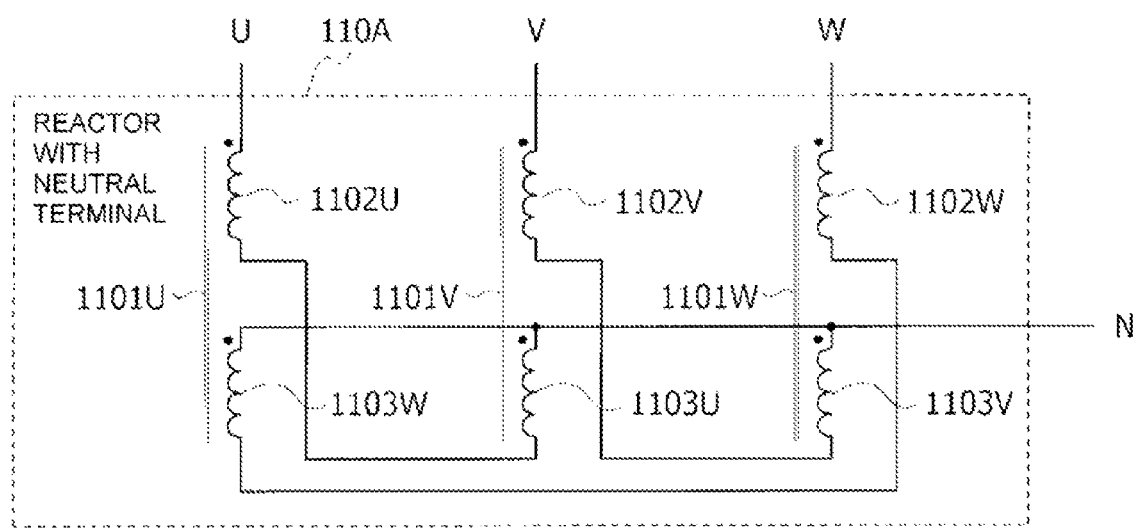
FIG. 6 is a view showing a reactor with a neutral terminal in the second embodiment.

FIG. 6 shows a reactor 110A with a neutral terminal as one structural example of the reactor 110 with the neutral terminal.

The reactor 110A with the neutral terminal includes a U-phase core leg 1101U, a V-phase core leg 1101V and a W-phase core leg 1101W.

A U-phase Zig winding 1102U and a W-phase Zag winding 1103W are wound around the U-phase core leg 1101U. A V-phase Zig winding 1102V and a U-phase Zag winding 1103U are wound around the V-phase core leg 1101V. Similarly, a W-phase Zig winding 1102W and a V-phase Zag winding 1103V are wound around the W-phase core leg 1101W.

One end of the U-phase Zig winding 1102U is connected to a point U, and the other end is connected to one end of the U-phase Zag winding 1103U. The other end of the U-phase Zag winding 1103U is connected to a point N. One end of the V-phase Zig winding 1102V is connected to a point V, and the other end is connected to one end of the V-phase Zag winding 1103V. The other end of the V-phase Zag winding 1103V is connected to the point N. One end of the W-phase Zig winding 1102W is connected to a point W, and the other end is connected to one end of the W-phase Zag winding 1103W. The other end of the W-phase Zag winding 1103W is connected to the point N.

In the U-phase core leg 1101U, the U-phase Zig winding 1102U and the W-phase Zag winding 1103W are magnetically coupled so that magnetomotive forces due to zero-sequence current commonly flowing through the Zig winding 1102U and the Zag winding 1103W are cancelled.

In the V-phase core leg 1101V, the V-phase Zig winding 1102V and the U-phase Zag winding 1103U are magnetically coupled so that magnetomotive forces due to zero-sequence current commonly flowing through the Zig winding 1102V and the Zag winding 1103U are cancelled.

Similarly, in the W-phase core leg 1101W, the W-phase Zig winding 1102W and the V-phase Zag winding 1103V are magnetically coupled so that magnetomotive forces due to zero-sequence current commonly flowing through the Zig winding 1102W and the Zag winding 1103V are cancelled.

In other words, the respective Zig windings 1102U, 1102V and 1102W and the respective Zag windings 1103U, 1103V and 1103W of the reactor 110A with the neutral terminal constitute zigzag connection. The zero-sequence currents (Idc/3) included in arm currents Iu, Iv and Iw flow through the reactor 110A with the neutral terminal. Thus, the reactor 110A with the neutral terminal cancels the magnetomotive forces due to the zero-sequence current (Idc/3), and DC magnetic fluxes generated in the respective core legs 1101U, 1101V and 1101W can be made substantially zero. By this, there is obtained an effect that the reactor 110A with the neutral terminal and the power conversion apparatus 102A using the same can be miniaturized.

Figure 7A:
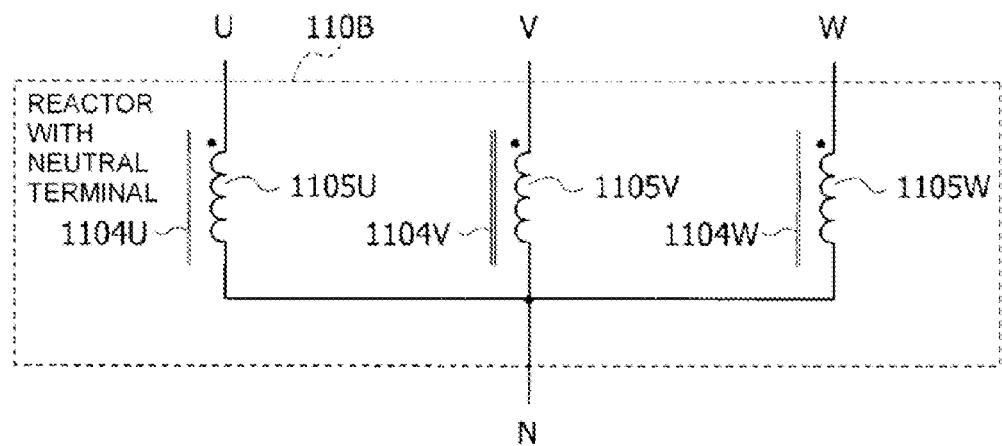
FIGS. 7A and 7B are views showing a reactor with a neutral terminal in a modified example of the second embodiment.
Figure 7B:
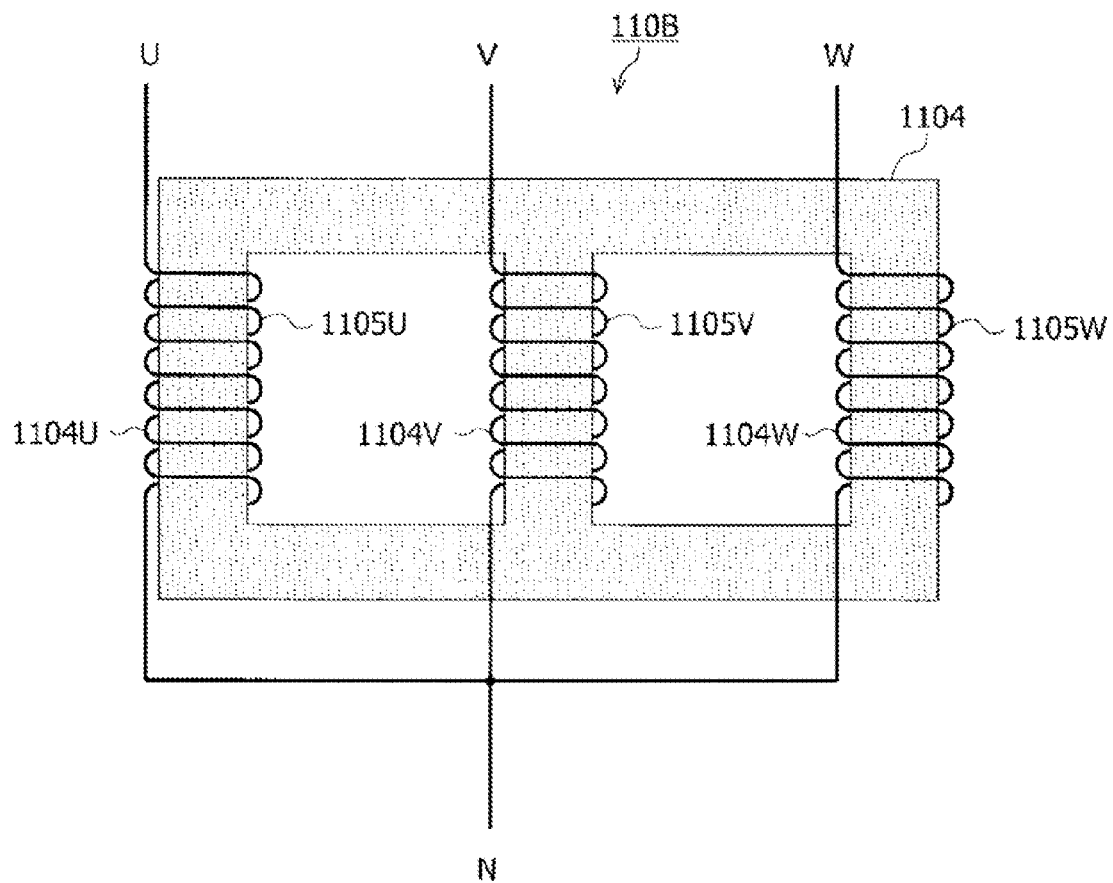

FIGS. 7A and 7B show a reactor 110B with a neutral terminal as another structural example of the reactor 110 with the neutral terminal.

As shown in FIG. 7A, the reactor 110B with the neutral terminal includes a three-leg core 1104 including a U-phase core leg 1104U, a V-phase core leg 1104V and a W-phase core leg 1104W.

A U-phase winding 1105U is wound around the U-phase core leg 1104U. One end of the U-phase winding 1105U is connected to a point U, and the other end is connected to a neutral terminal N.

A V-phase winding 1105V is wound around the V-phase core leg 1104V. One end of the V-phase winding 1105V is connected to a point V, and the other end is connected to the neutral terminal N.

Similarly, a W-phase winding 1105W is wound around the W-phase core leg 1104W. One end of the W-phase winding 1105W is connected to a point W, and the other end is connected to the neutral terminal N.

As shown in FIG. 7B, the U-phase core leg 1104U, the V-phase core leg 1104V and the W-phase core leg 1104W constitute the three-leg core 1104. That is, the reactor 110B with the neutral terminal is the three-leg core reactor.

When the three-leg core 1104 is used, magnetic flux generated by magnetomotive force due to zero-sequence current (Idc/3) passes through a space outside the core having high magnetic resistance. Thus, the magnetic flux due to the zero-sequence current (Idc/3) can be reduced. Thus, there is an effect that the reactor 110B with the neutral terminal and the power conversion apparatus 102A using the same can be miniaturized.

Modified Examples

The invention is not limited to the above embodiments and includes various modified examples. For example, the above embodiments are described in detail in order to make the invention easy to understand, and the invention is not necessarily limited to one including all the described components. A part of components of one embodiment can be replaced by components of the other embodiment, and components of one embodiment can be added with components of the other embodiment. Besides, with respect to a part of components of the respective embodiments, addition/deletion/replacement of other components can be made.

A part or all of the respective components, functions, processing parts, processing units and the like may be realized by hardware such as an integrated circuit. The respective components, functions and the like can be realized by software in which a processor interprets and executes a program for realizing the respective functions. Information such as the program for realizing the respective functions, tables and files can be stored in a storage device such as a memory, a hard disk or a SSD (Solid State Drive), or a recording medium such as a flash memory card or a DVD (Digital Versatile Disk).

In the respective embodiments, control lines and information lines are shown which appear to be necessary for the description, and all control lines and information lines of a product are not necessarily shown. Actually, it may be regarded that almost all the components are mutually connected.

As modified examples of the invention, for example, the followings (a) to (d) are conceivable.

(a) The description of the power conversion apparatus 102, 102A holds true even when the direction of power is reversed. That is, in the power conversion apparatus 102, 102A, the rotary electric machine 103, 103A may be made a power generator, and the generated power may be supplied between the point P and the point N.

(b) In the power conversion apparatus 102, 102A, the rotary electric machine 103, 103A has three phases, and the number of the arms 104 is three. However, no limitation is made to this. In the power conversion apparatus, the rotary electric machine may have four or more phases, and the same number of arms 104 as the number of phases of the rotary electric machine may be used.

(c) As the structural examples of the reactor 110 with the neutral terminal of the second embodiment, the reactor 110A with the neutral terminal (see FIG. 6) constructed of the zigzag connection, and the reactor 110B with the neutral terminal (see FIGS. 7A and 7B) including the three-leg core are described. However, no limitation is made to this. A different structured reactor with a neutral terminal capable of drawing a neutral terminal may be used in the power conversion apparatus.

(d) The energy storage element of the unit converter 105 is not limited to the electrolytic capacitor, and an electric double-layer capacitor, a secondary battery or the like may be used.

What is claimed is:

1. A power conversion apparatus comprising:
    three or more arms in each of which one or more unit converters each including an energy storage element and capable of outputting an arbitrary voltage are connected in series;
    a first node to which first ends of the respective arms is Y-connected, the first node being connected to a first side of a DC power supply, wherein
    second ends of the respective arms are connected to first ends of respective Y-connected phase windings of a rotary electric machine, and
    second ends of the Y-connected phase windings are connected to a second side of the DC power supply,
    wherein each energy storage element is supplied with power through the first side or the second side of the DC power supply.

2. The power conversion apparatus according to claim 1, further comprising a second node to which a neutral terminal of the rotary electric machine is connected.

3. The power conversion apparatus according to claim 2, wherein the second node to which the neutral terminal of the rotary electric machine is connected is grounded.

4. The power conversion apparatus according to claim 1, further comprising:
    a reactor with a neutral terminal connected in parallel to the rotary electric machine; and
    a second node to which the neutral terminal of the reactor with the neutral terminal is connected.

5. The power conversion apparatus according to claim 4, wherein a positive-sequence inductance of the reactor with the neutral terminal is larger than a zero-sequence inductance.

6. The power conversion apparatus according to claim 4, wherein the reactor with the neutral terminal has a zigzag connection.

7. The power conversion apparatus according to claim 4, wherein a core of the reactor with the neutral terminal is a three-leg core.

8. The power conversion apparatus according to claim 4, wherein the neutral terminal of the reactor with the neutral terminal is grounded.

9. The power conversion apparatus according to claim 1, wherein a part or all of the unit converters are bi-directional chopper circuits.

10. The power conversion apparatus according to claim 1, wherein a part or all of the unit converters are full-bridge circuits.

11. An electrical-mechanical energy conversion system comprising:
    a power conversion apparatus which includes:
        three or more arms in each of which one or more unit converters each including an energy storage element and capable of outputting an arbitrary voltage are connected in series,
        a first node to which first ends of the respective arms is Y-connected, the first node being connected to a first side of a DC power supply, wherein
        second ends of the respective arms are connected to first ends of respective Y-connected phase windings of a rotary electric machine, and
        second ends of the Y-connected phase windings are connected to a second side of the DC power supply,
        wherein each energy storage element is supplied with power through the first side or the second side of the DC power supply; and
    a rotary electric machine to which a mechanical load is connected and in which another end of the respective arms is connected to one end of respective phase windings.

* * * * *